Patented Feb. 18, 1947

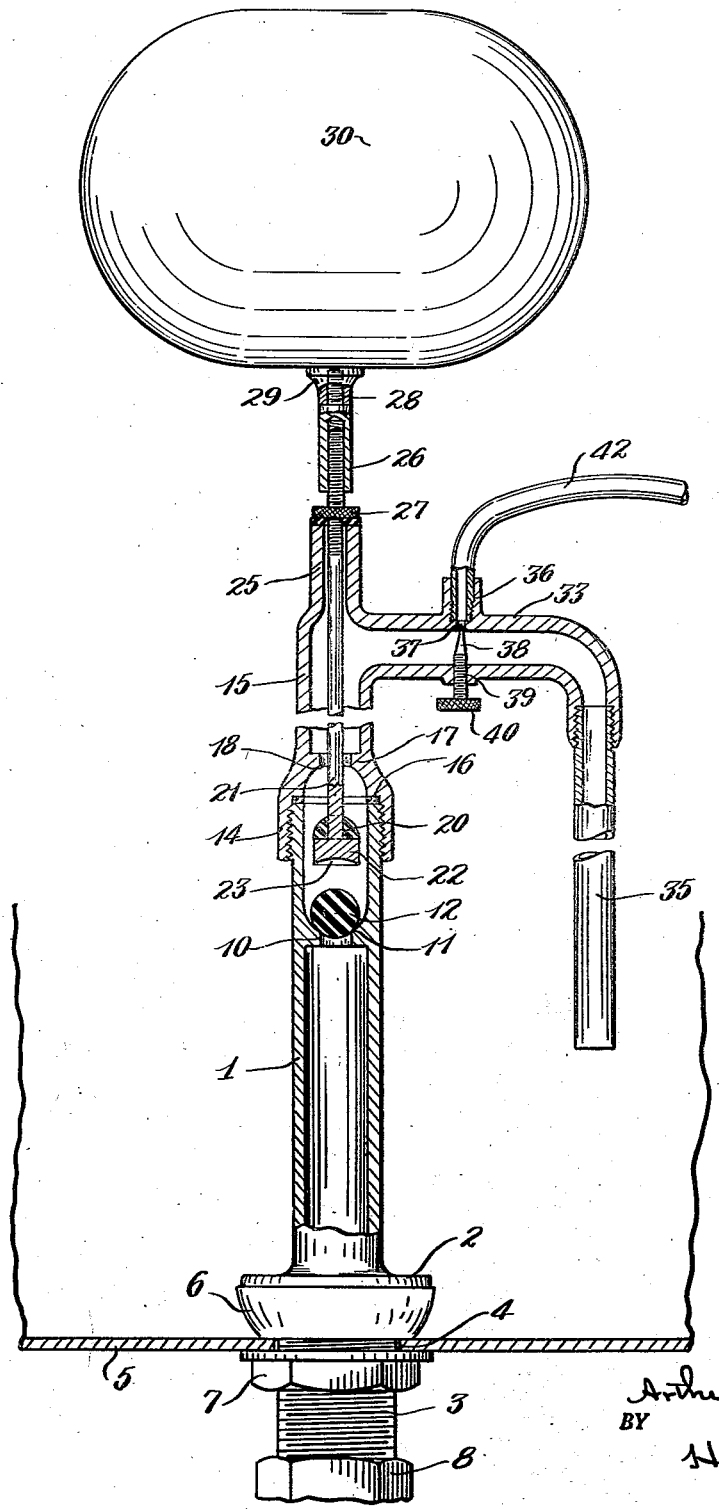

2,415,875

UNITED STATES PATENT OFFICE 2,415,875

FLUSHING TANK INLET VALVE

Arthur A. Greenwald, Cleveland, Ohio

Application September 13, 1943, Serial No. 502,148

1 Claim. (Cl. 137—104)

This invention pertains to float operated inlet valves for flushing tanks, and it has as its more general object the provision of a simple, yet very efficient and durable construction for valves of this class and one in which repair and replacement of the valve parts may be quickly and easily accomplished.

Another object of the invention is to provide a simple and convenient adjustment in the float connections whereby the water level in the flushing tank may be changed according to the requirements of the installation.

As is known to those acquainted with the subject to which the invention relates, a suction in the water supply line frequently follows a flushing operation and causes a siphoning of water from the tank back into the line. It is an object of the invention to avoid this action by providing a check valve that will close the instant reverse flow occurs and which adds very little to the expense of the device.

Another object of the invention is to incorporate in the device means, desirably in the form of a needlepoint valve, for limiting the quantity of water that may escape through the refill tube thereby to avoid unnecessary waste of water which is common in devices of the class under consideration, especially where high pressures in the water supply lines are encountered.

Other objects and advantages will appear as I proceed to describe the invention by reference to the accompanying drawing wherein the view is a side elevation, partly in section, of an inlet valve constructed in accordance with the invention.

Referring to the parts of the structure by reference characters, 1 is a tubular column having a base flange 2 and a threaded extension 3 below said flange which is adapted to be projected through an opening 4 in the bottom wall 5 of the tank. The usual conical washer 6, of rubber or the like, is compressed between the flange 2 and wall 5, thereby to seal the opening 4, when the column is drawn down by the screwing up of a nut 7 that is applied to the threaded extension 3 and is engaged with the bottom of the tank. The water supply line (not shown) is adapted to be connected by a slip nut 8 with the lower end of the threaded extension 3. A flange 10 surrounds the interior of the column 1 a suitable distance below the top thereof and is formed with an upwardly facing valve seat 11 wherewith a spherical valve member 12 is adapted to engage, said member preferably consisting of a rubber ball.

The upper end of the column 1 is externally threaded for screw connection with the internally threaded bottom extension 14 of a casing 15. A washer 16 is interposed between the top of the column 1 and a shoulder formed on the interior of the casing adjacent the bottom extension thereof. Extending about the interior of the casing 15 a short distance above said shoulder is a flange 17 that is formed with a downwardly facing valve seat 19 wherewith a semi-spherical valve member 20 is adapted to engage. The valve member 20 is desirably formed of rubber and has a central opening whose axis is normal to the flat bottom face of the member. Engaged upwardly through said opening of the valve member 20 is a valve stem 21 that is shown as provided at its lower end with a head 22 that is cylindrical and has a concave lower face 23 against which the first mentioned valve member 12 may strike as said member is lifted by the upward flow of water through the column. The parts are illustrated in the drawing in the positions they would occupy if the water were turned off, or if a siphoning action were in progress, as above explained. The upper end of the casing 15 is reduced in diameter to provide a tubular guide 25 for the valve stem 21, and above said guide a connector 26 is screwed onto the threaded end of the valve stem. This connector has a relatively deep threaded recess that opens through its lower end so that it may be adjusted axially of the valve stem and thus determine the height to which the water may rise within the tank, as will be readily understood. The connector is desirably formed of plastic, or of a fibrous material that is impervious to water, so that, by the parts being of the right proportions, a binding action will be set up between the connector and stem that will cause them to retain the relation to which they are adjusted. A knurled stop nut 27 is threaded on the stem below the connector 26 and a washer of cushion material surrounds the stem below said nut. The nut serves the purpose of limiting the descent of the valve stem and consequently the drop of the valve member 20 away from the seat 19. The washer aforesaid, striking the top of the guide 25 when the float drops, dampens the blow and prevents an unpleasant metallic sound being made. The upper end of the connector 26 terminates in a threaded boss 28 that is screwed into the socket member 29 of the float 30.

The casing 15 is provided with a lateral branch 33 that curves downwardly at its outer end and is shown as internally threaded for the reception of the threaded upper end of the fill pipe 35.

Rising from the top wall of the branch 33 is a tubular boss 36, the bore of which is smooth for a distance downwardly from the top of the boss and is then threaded. The boss communicates with the interior of the branch 33 through an orifice 37 into which is adapted to be projected the needlepoint valve 38 that is formed by the pointed end of a screw 39 that is threadedly engaged through the lower wall of the branch 33, the screw being provided with a knurled head 40 for convenient adjustment. The threaded extremity of a refill tube 42 is screwed into the threaded portion of the bore of the boss 36, the smooth portion of the bore being occupied by an unthreaded part of the tube 42. Thus, in the bending of the refill tube to dispose its outlet end in position to discharge in the overflow pipe (not shown) in accordance with the usual practice, the tube is prevented from bending in the immediate region of its threaded end where the wall of the tube is weakened and is liable to crack if bent. By means of the needlepoint valve 38 the quantity of water escaping through the refill tube 42 may be regulated and wastage thus avoided.

When the flushing tank contains a full supply of water, the float lifts the stem 21 and engages the valve 20 with the seat 18 to shut off the flow of water upwardly through the column 1 and into the casing 15. Under these conditions the ball valve member 12 settles into engagement with the seat 11. As soon as the tank is flushed, the float 30 drops and lowers the valve 20 from the seat 18, whereupon water will rise through the column 1, lifting the valve 12 from its seat, and pass on through the casing and out through the branch 33 thereof and downwardly through the fill pipe 35 to the bottom of the tank. As customary, the fill pipe has its lower end below the minimum water level in the tank so as to avoid splash and noise. The internal cross-sectional area of the pipe 35 is less than that of the major portion of the branch 33 so that sufficient back pressure will build up within the branch to insure flow through the refill tube 42.

In case suction occurs in the supply pipe and column 1, the valve 12 will snap to its seat and prevent reverse flow or siphoning. Access to both valve members 12 and 20, and to the seats 11 and 18, may be had by unscrewing the casing from the column; and if the valve 20 is so worn as to require replacement, the connector 26 and stop nut 27 may be unscrewed from the end of the stem 21 and the stem dropped from the casing 15 so that the worn valve member may be replaced by a new one after which the stem 21 is projected upwardly through the casing and the stop nut 27 applied and readjusted and the float reconnected to the stem. The valve member 12 may be replaced in an obviously convenient manner while the casing 15 is removed.

Having thus described my invention, what I claim is:

A valve of the class described comprising a tubular column having an upwardly facing valve seat surrounding the bore thereof and spaced a distance below the top end of the column, a spherical valve member of resilient material free within the top of the column for engagement with said seat, a casing having screw connection at its lower end with the top of the column, a downwardly facing valve seat surrounding the bore of the casing adjacent the bottom thereof, the casing incorporating at its upper end a tubular guide that is in axial alignment with the beforementioned valve seats, a valve stem extending upwardly through the plane of the second mentioned valve seat and through said guide, a float operatively connected to the upper end of the stem, the stem terminating at its lower end in a head that serves as a stop for the above mentioned valve member, a second valve member of resilient material surrounding the stem and sustained by said head and arranged for engagement with the second mentioned valve seat, the casing having a lateral branch intermediate said second mentioned valve seat and said guide, said branch terminating in a downwardly extended fill pipe, a hollow boss rising from the branch and the bore of which is threaded part way up from the bottom and is smooth therebeyond, a refill tube having its end threaded and screwed into the threaded portion of the bore, an unthreaded portion of the tube occupying the smooth portion of said bore, an orifice in the wall of the said branch through which the refill tube communicates with the interior of the branch, and a needle point valve threaded through the wall of the branch opposite said orifice for controlling flow of water through the orifice, the interior cross sectional area of the fill pipe being less than the cross sectional area of said branch in the region of said orifice and between said region and the casing.

ARTHUR A. GREENWALD.

REFERENCES CITED

The following references are of record in the file of this patent:

UNITED STATES PATENTS

| Number | Name | Date |
|---|---|---|
| 1,182,903 | Grossmann | May 16, 1916 |
| 1,477,916 | Sikes | Dec. 18, 1923 |
| 1,007,191 | Foley | Oct. 31, 1911 |
| 1,965,322 | Steen | July 3, 1934 |
| 1,734,762 | Clemmons | Nov. 5, 1929 |
| 1,980,144 | Siena | Nov. 6, 1934 |
| 2,197,636 | Flutch | Apr. 16, 1940 |
| 737,632 | Jennings | Sept. 1, 1903 |
| 2,326,544 | Martin | Aug. 10, 1943 |
| 1,488,835 | Robertson | Apr. 1, 1924 |
| 1,177,963 | Peterson | Apr. 4, 1916 |

FOREIGN PATENTS

| Number | Country | Date |
|---|---|---|
| 1,317 | British | Mar. 19, 1896 |
| 28,097 | British | Dec. 24, 1908 |
| 1,870 | British | 1875 |